(12) United States Patent
Myrick

(10) Patent No.: US 6,550,152 B2
(45) Date of Patent: *Apr. 22, 2003

(54) ADJUSTABLE SPIRIT LEVEL FOR TILE AND CABINET INSTALLATION

(75) Inventor: Charles Myrick, Duarte, CA (US)

(73) Assignee: Ronald S. Pole, Inglewood, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/973,268

(22) Filed: Oct. 5, 2001

(65) Prior Publication Data

US 2002/0040532 A1 Apr. 11, 2002

Related U.S. Application Data

(63) Continuation-in-part of application No. 09/684,901, filed on Oct. 10, 2000, now Pat. No. 6,481,111.

(51) Int. Cl.[7] .................................................. G01C 9/18
(52) U.S. Cl. ........................... 33/526; 33/613; 33/375
(58) Field of Search .......................... 33/376, 451, 452, 33/478, 492, 526, 527, 613, 645, 374, 375, 484, 485, 333, 334

(56) References Cited

U.S. PATENT DOCUMENTS

| | | | | | |
|---|---|---|---|---|---|
| 330,124 A | * | 11/1885 | Jewell | ............... | 33/485 |
| 662,991 A | * | 12/1900 | Luvan | ............... | 33/290 |
| 2,594,543 A | * | 4/1952 | Douglas | ............... | 33/375 |
| 3,744,141 A | * | 7/1973 | Strickland, Sr. | ............... | 33/180 |
| 4,435,908 A | * | 3/1984 | Semler, Jr. | ............... | 33/376 |
| 4,583,343 A | * | 4/1986 | Camp | ............... | 52/749.11 |
| 4,782,597 A | * | 11/1988 | Mills | ............... | 33/370 |
| 4,928,395 A | * | 5/1990 | Good | ............... | 33/374 |
| 4,970,796 A | * | 11/1990 | Masters et al. | ............... | 33/347 |
| 5,263,260 A | * | 11/1993 | Smith | ............... | 33/526 |
| 5,398,423 A | * | 3/1995 | Smith | ............... | 33/526 |
| 5,927,675 A | * | 7/1999 | Kratish et al. | ............... | 284/466 |
| 5,933,973 A | * | 8/1999 | Fenley, Jr. | ............... | 33/451 |
| 5,992,034 A | * | 11/1999 | Prucha et al. | ............... | 33/474 |
| 6,041,510 A | * | 3/2000 | Huff | ............... | 33/374 |
| 6,173,503 B1 | * | 1/2001 | Houghton et al. | ............... | 33/454 |
| 6,279,240 B1 | * | 8/2001 | Bonaventrua, Jr. | ............... | 33/374 |
| 6,294,023 B1 | * | 9/2001 | Schooley | ............... | 33/374 |
| 6,481,111 B1 | * | 4/2002 | Myrick | ............... | 33/526 |

* cited by examiner

Primary Examiner—Diego Gutierrez
Assistant Examiner—Tania C. Courson
(74) Attorney, Agent, or Firm—David A. Belasco; Belasco, Jacobs & Townsley, LLP.

(57) ABSTRACT

A spirit level for the installation of tile and cabinets includes a rigid body having upper and lower parallel planar surfaces separated by a first predetermined width. The body includes a bubble vial oriented to verify the orientation of the level. An auxiliary edge portion has a planar top surface and lower supporting edges parallel to the top surface separated by a second predetermined width. Means are provided for removably attaching the auxiliary edge portion to the upper planar surface of the body, thereby providing a level having two standard widths corresponding to industry standard tiles. A series of evenly spaced holes are provided for removably securing the body to a flat surface. The ends of the body include parallel planar end surfaces normal to the upper and lower planar surfaces. A threaded hole is provided penetrating the surface of the body. A threaded setscrew is provided to engage the threaded hole and to bear upon the auxiliary edge. An adjusting notch is provided with a recessed planar surface is disposed at either end of the body at the planar lower surface. A threaded opening is provided centrally located in the recessed planar surface. A threaded bolt to engage the threaded opening is provided and is of sufficient length to extend outwardly from the threaded opening to a point beyond the planar lower surface when unscrewed from the nut so as to adjust the level to uneven surfaces.

11 Claims, 2 Drawing Sheets

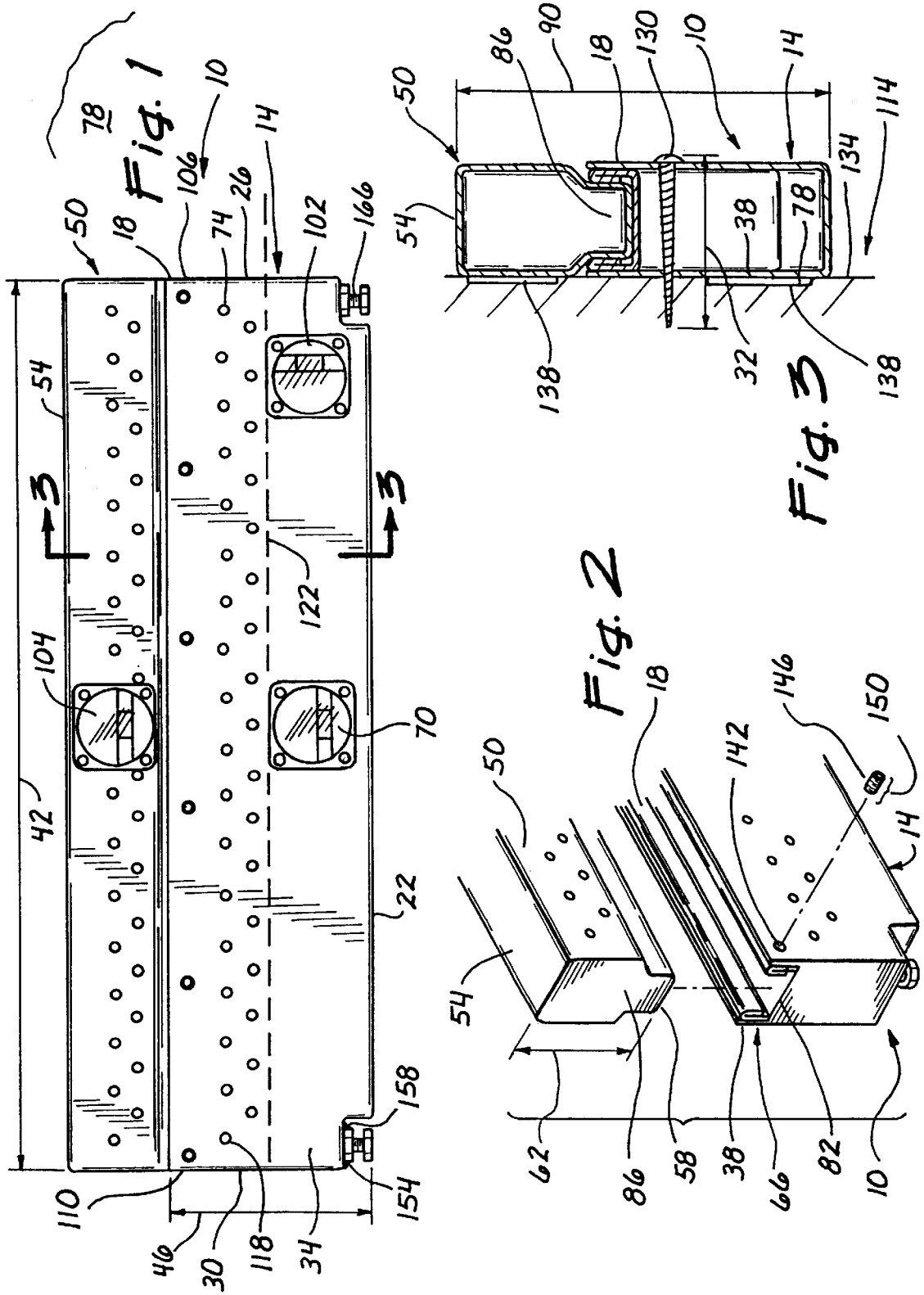

ADJUSTABLE SPIRIT LEVEL FOR TILE AND CABINET INSTALLATION

EARLIER FILED APPLICATION

The instant application is a continuation-in-part of applicant's prior application filed Oct. 10, 2000 and having Ser. No. 09/684,901, now U.S. Pat. No. 6,481,111, the disclosure of which is specifically incorporated by reference herein.

FIELD OF INVENTION

The invention pertains to leveling devices. More particularly, the invention relates to adjustable devices for accurately orienting tile and cabinet installations.

BACKGROUND OF THE INVENTION

Various inventions have been developed for installing and properly orienting tile, cabinets and other wall mounted devices. U.S. Pat. No. 4,583,343 issued to Camp is directed to a tile setting kit. The kit includes a starter rack with uniformly displaced spacers for the first course of tiles; an elongated guide frame having replaceable spacer rails with a plurality of uniformly spaced cross teeth arranged in accordance with selected tile size, the frame further having a bubble level for tile course alignment.

U.S. Pat. No. 3,744,141 issued to Strickland, Sr., discloses a tile setters gauge. The support device includes a first tile supporting bar having adjustable means for changing the effective length of the bar. Additional tile supporting bars extend from each end of the bar at substantially right angles, the dimensions of the supporting bars detailed to extend around the upper surface of and adjacent three lateral edges of a bathtub. A number of adjustable elements are operatively connected to the tile supporting bars so that the bars may be angularly oriented relative to a predetermined horizontal line.

U.S. Pat. No. 5,263,260, issued to Smith is directed to a device and method for facilitating the installation of fascia materials such as tile on bathtub walls, fireplace facings and similar walls. The device includes a support member with arms that extend so as to fit between facing side walls and to be self supporting. Side bar members are attached to the support member and leveled for the installation of tile on the facing walls of a bathtub or shower stall. The support member and side bar members have spirit levels attached for level adjustment.

U.S. Pat. No. 5,933,973 issued to Fenley, Jr., describes a method and apparatus for assisting in hanging framed pictures and achieving proper alignment. The device is an elongated ruler having a row of calibration marks and a set of nail holes at spaced intervals. The ruler extends through a housing having a slot at either end. A pair of orthogonally oriented bubble levels is provided for orienting the housing on a wall surface. The housing and ruler enable ruler movement while making measurements along the wall.

While other variations exist, the above-described inventions for installing tile, cabinets or other items are typical of those encountered in the prior art. It is an objective of the present invention to provide means for installing tile, cabinets or similar devices in a level fashion. It is a further objective to provide a level starting course for tiles of at least two industry standard dimensions. It is a still further objective of the invention to provide a means to temporarily secure the invention to a vertical surface, thus freeing the hands of a user. It is yet a further objective to provide a leveling device for tile, cabinets, and other items that is adjustable for use with uneven surfaces.

While some of the objectives of the present invention are disclosed in the prior art, none of the inventions found include all of the requirements identified.

SUMMARY OF THE INVENTION

The present invention addresses all of the deficiencies of prior art leveling inventions for tile and cabinet installation and satisfies all of the objectives described above.

A level for tile and cabinet installation providing the desired features may be constructed from the following components. A rigid body is provided. The body has a planar upper surface, a planar lower surface parallel to the upper surface, a first end, a second end, a front surface, a back surface and a first predetermined length. The upper and lower planar surfaces are separated by a first predetermined width.

An auxiliary edge portion is provided. The edge portion has a planar top surface and lower supporting edges parallel to the top surface. The top planar surface and lower supporting edges are separated by a second predetermined width. Means are provided for removably attaching the auxiliary edge portion to the upper planar surface of the rigid body.

At least one bubble vial is provided. The vial is fixedly attached to the rigid body for indicating when the upper and lower planar surfaces are horizontally oriented. Means are provided for removably securing the rigid body to a flat surface.

In a variant of the invention, the means for removably attaching the auxiliary edge portion to the upper planar surface of the rigid body further includes a groove formed in the upper surface of the rigid body. A mating tongue portion extends downwardly from the lower supporting edges of the auxiliary edge portion and is sized, shaped, and located to removably engage the groove. When so engaged, the top surface of the auxiliary edge portion will be parallel to upper surface of the rigid body and the level will have a width equal to the sum of the first predetermined width and the second predetermined width.

In a further variant of the invention, at least one bubble vial is fixedly attached to the rigid body for indicating when the upper and lower planar surfaces are vertically oriented.

In yet a further variant of the invention, at least one bubble vial is fixedly attached to the auxiliary edge portion for indicating when the top surface of the auxiliary edge portion and the lower supporting edges are horizontally oriented.

In another variant, the first end and second end include parallel planar end surfaces normal to the upper and lower planar surfaces.

In still another variant, the means for removably securing the rigid body to a flat surface includes a series of holes that penetrate the rigid body perpendicular to a long axis of the level and at least two nails or screws. The nails or screws are of sufficient length to pass though the holes in the rigid body and to secure the rigid body to the flat surface.

In still a further variant, the series of holes is evenly spaced along the rigid body to facilitate removably attaching the level to supporting structures located behind the flat surface.

In yet another variant, a series of frictional pads are fixedly attached to the back surface of the body and serve to facilitate positioning the level on the flat surface.

In still a further variant, at least one threaded hole is provided. The threaded hole penetrates either of the front surface and the back surface of the rigid body adjacent the planar upper surface and extends into the groove. At least one threaded setscrew is provided. The setscrew is sized, shaped and of sufficient length to threadedly engage the threaded hole and to bear upon the auxiliary edge portion. So when engaged, the threaded hole will serve to removably secure the auxiliary edge portion of the rigid body.

In yet a further variant, at least one adjusting notch is provided. The adjusting notch is disposed at either of the first end and second end of the rigid body at the planar lower surface. The adjusting notch includes a recessed planar surface parallel to the planar lower surface.

An opening is provided. The opening is centrally located in the recessed planar surface and is sized and shaped to permit passage of a threaded shaft. An internally threaded nut is provided. The internally threaded nut has a planar upper surface, an internally threaded orifice orthogonal to the planar upper surface and has a diameter smaller than the opening. The internally threaded nut is fixedly attached to the recessed planar surface over the opening. A threaded bolt is provided. The threaded bolt has a threaded shaft sized and shaped to threadedly engage the nut and is of sufficient length to extend outwardly from the nut to a point beyond the planar lower surface when unscrewed from the nut. So when engaged, the bolt is unscrewed sufficiently from the nut to extend beyond the planar lower surface to adjust the planar lower surface to an uneven surface.

In a final variant, at least one adjusting notch is provided. The adjusting notch is disposed at either of the first end and second end of the rigid body at the planar lower surface. The adjusting notch includes a recessed planar surface parallel to the planar lower surface. A threaded opening is provided. The threaded opening is centrally located in the recessed planar surface. A threaded bolt is provided. The bolt has a threaded shaft sized and shaped to threadedly engage the threaded opening and is of sufficient length to extend outwardly from the threaded opening to a point beyond the planar lower surface when unscrewed from the opening. So when engaged, the bolt is unscrewed sufficiently form the threaded opening to extend beyond the planar lower surface to adjust the planar lower surface to an uneven surface.

DESCRIPTION OF THE DRAWINGS

FIG. 1 is a side elevational view of the preferred embodiment of the invention illustrating attaching holes and bubble vials;

FIG. 2 is a partial perspective view of the FIG. 1 embodiment illustrating the preferred attachment of the auxiliary edge portion;

FIG. 3 is a cross-sectional view of the FIG. 1 embodiment taken along the line 3—3 illustrating frictional pads and means for attaching to a flat surface;

DETAILED DESCRIPTION OF THE PREFERRED EMBODIMENT

Figure 4:
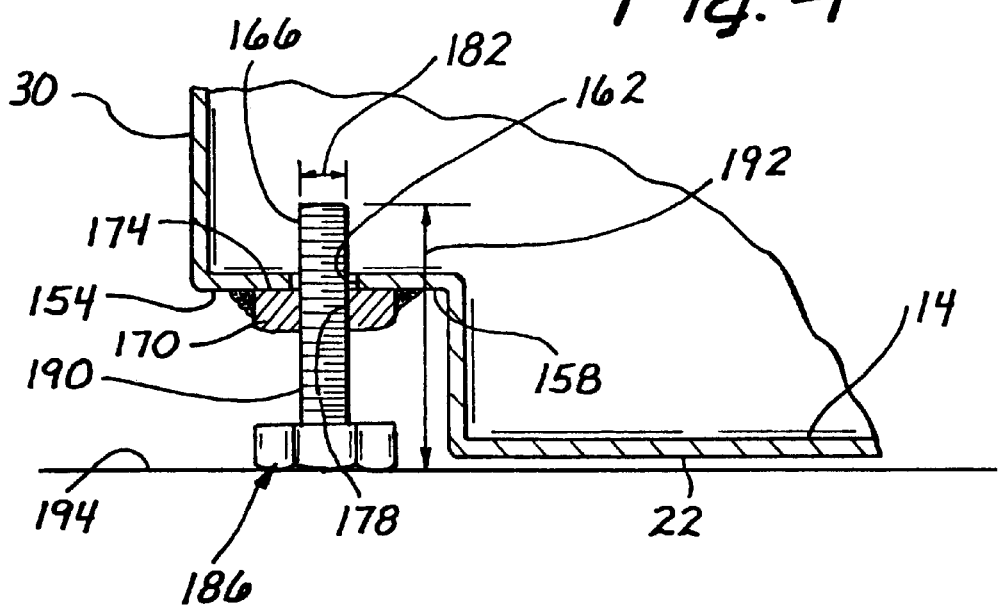
FIG. 4 is a detailed perspective view of the FIG. 1 embodiment illustrating the adjusting notch and externally attached threaded nut.

As illustrated in FIG. 1, a level for tile and cabinet installation 10 providing the desired features may be constructed from the following components. A rigid body 14 is provided. The body 14 has a planar upper surface 18, a planar lower surface 22 parallel to the upper surface 18, a first end 26, a second end 30, a front surface 34, a back surface 38 and a first predetermined length 42. The upper 18 and lower 22 planar surfaces are separated by a first predetermined width 46.

As illustrated in FIG. 2, an auxiliary edge portion 50 is provided. The edge portion 50 has a planar top surface 54 and lower supporting edges 58 parallel to the top surface 54. The top 54 planar surface and lower supporting edges 58 are separated by a second predetermined width 62. Means 66 are provided for removably attaching the auxiliary edge portion 50 to the upper planar surface 18 of the rigid body 14.

As shown in FIG. 1, at least one bubble vial 70 is provided. The vial 70 is fixedly attached to the rigid body 14 for indicating when the upper 18 and lower 22 planar surfaces are horizontally oriented. Means 74 are provided for removably securing the rigid body 14 to a flat surface 78.

In a variant of the invention, illustrated in FIGS. 1, 2 and 3, the means 66 for removably attaching the auxiliary edge portion 50 to the upper planar surface 18 of the rigid body 14 further includes a groove 82 formed in the upper surface 18 of the rigid body 14. A mating tongue portion 86 extends downwardly from the lower supporting edges 58 of the auxiliary edge portion 50 and is sized, shaped, and located to removably engage the groove 82. When so engaged, the top surface 54 of the auxiliary edge portion 50 will be parallel to upper surface 18 of the rigid body 14 and the level 10 will have a width 90 equal to the sum of the first predetermined width 46 and the second predetermined width 62.

In still a further variant of the invention, illustrated in FIG. 1, at least one bubble vial 102 is fixedly attached to the rigid body 14 for indicating when the upper 18 and lower 22 planar surfaces are vertically oriented.

In yet a further variant of the invention, also illustrated in FIG. 1, at least one bubble vial 104 is fixedly attached to the auxiliary edge portion 50 for indicating when the top surface of the auxiliary edge portion 54 and the lower supporting edges 58 are horizontally oriented.

In another variant, illustrated in FIG. 1, the first end 26 and second end 30 include parallel planar end surfaces 106, 110 normal to the upper 18 and lower 22 planar surfaces.

In still another variant, illustrated in FIGS. 1, 2 and 3, the means 74 for removably securing the rigid body 14 to a flat surface 78 includes a series of holes 118 that penetrate the rigid body 14 perpendicular to a long axis 122 of the level 10 and at least two nails (not shown) or screws 130. The nails or screws 130 are of sufficient length 132 to pass though the holes 118 in the rigid body 14 and to secure the rigid body 14 to the flat surface 78.

In still a further variant, as illustrated in FIG. 1, the series of holes 118 is evenly spaced along the rigid body 14 to facilitate removably attaching the level 10 to supporting structures (not shown) located behind the flat surface 78.

In yet another variant, as illustrated in FIG. 3, a series of frictional pads 138 are fixedly attached to the back surface 38 of the body 14 and serve to facilitate positioning the level 10 on the flat surface 78.

In still a further variant, as illustrated in FIG. 2, at least one threaded hole 142 is provided. The threaded hole 142 penetrates either of the front surface 34 and the back surface 38 of the rigid body 14 adjacent the planar upper surface 18 and extends into the groove 82. At least one threaded setscrew 146 is provided. The setscrew 146 is sized, shaped and of sufficient length 150 to threadedly engage the threaded hole 142 and to bear upon the auxiliary edge portion 50. So when engaged, the threaded hole 142 will serve to removably secure the auxiliary edge portion 50 of the rigid body 14.

In yet a further variant, as illustrated in FIG. 4, at least one adjusting notch 154 is provided. The adjusting notch 154 is disposed at either of the first end 26 and second end 30 of the rigid body 14 at the planar lower surface 22. The adjusting notch 154 includes a recessed planar surface 158 parallel to the planar lower surface 22.

An opening 162 is provided. The opening 162 is centrally located in the recessed planar surface 158 and is sized and shaped to permit passage of a threaded shaft 166. An internally threaded nut 170 is provided. The internally threaded nut 170 has a planar upper surface 174, an internally threaded orifice 178 orthogonal to the planar upper surface 174 and has a diameter 182 smaller than the opening 162. The internally threaded nut 170 is fixedly attached to the recessed planar surface 158 over the opening 162. A threaded bolt 186 is provided. The threaded bolt 186 has a threaded shaft 190 sized and shaped to threadedly engage the nut 170 and is of sufficient length 192 to extend outwardly from the nut 170 to a point beyond the planar lower surface 22 when unscrewed from the nut 170. So when engaged, the bolt 186 is unscrewed sufficiently from the nut 170 to extend beyond the planar lower surface 22 to adjust the planar lower surface 22 to an uneven surface 194.

Figure 5:
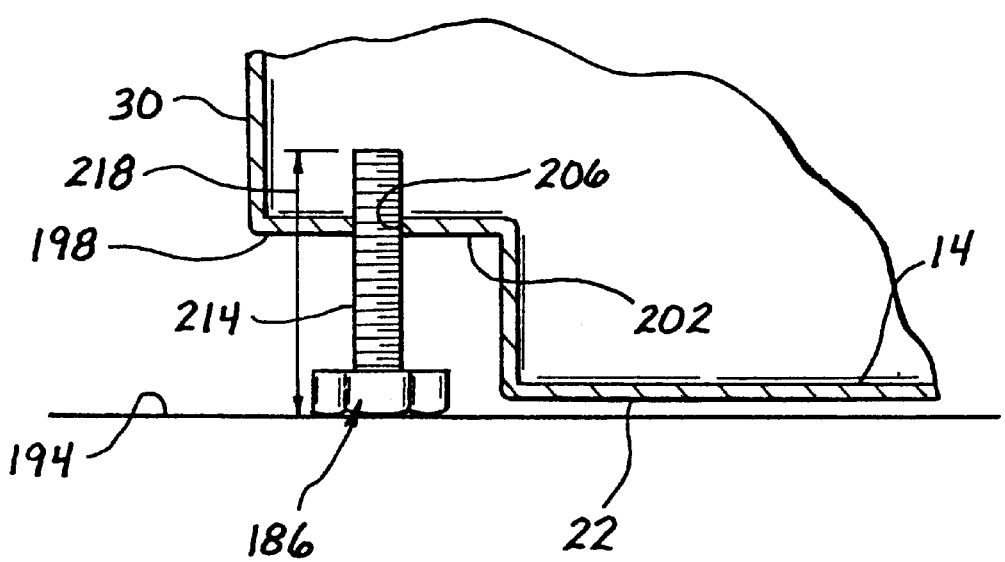
FIG. 5 is a detailed perspective view of the FIG. 1 embodiment illustrating the adjusting notch with threaded orifice in the recessed planar surface.

In a final variant, as illustrated in FIG. 5, at least one adjusting notch 198 is provided. The adjusting notch 154 is disposed at either of the first end 26 and second end 30 of the rigid body 14 at the planar lower surface 22. The adjusting notch 154 includes a recessed planar surface 158 parallel to the planar lower surface 22. A threaded opening 206 is provided. The threaded opening 206 is centrally located in the recessed planar surface 158. A threaded bolt 186 is provided. The bolt 186 has a threaded shaft 190 sized and shaped to threadedly engage the threaded opening 206 and is of sufficient length 192 to extend outwardly from the threaded opening 206 to a point beyond the planar lower surface 22 when unscrewed from the opening 206. So when engaged, the bolt 186 is unscrewed sufficiently form the threaded opening 206 to extend beyond the planar lower surface 22 to adjust the planar lower surface 22 to an uneven surface 194.

The final spirit level for the installation of tile and cabinets 10 has been described with reference to particular embodiments. Other modifications and enhancements can be made without departing from the spirit and scope of the claims that follow.

What is claimed is:

1. A spirit level for tile and cabinet installation, comprising:
    a rigid body, said body having a planar upper surface, a planar lower surface parallel to said upper surface, a first end, a second end, a front surface, a back surface and a first predetermined length;
    said upper and lower planar surfaces being separated by a first predetermined width;
    an auxiliary edge portion, said edge portion having a planar top surface and lower supporting edges parallel to said top surface;
    said top surface and lower supporting edges being separated by a second predetermined width;
    means for removably attaching said auxiliary edge portion to the upper planar surface of said rigid body so that said upper planar surface and said lower supporting edges are in contact when said auxiliary edge portion is attached to said rigid body;
    at least one bubble vial, said vial being fixedly attached to said rigid body for indicating when said upper and lower planar surfaces are horizontally oriented; and
    means for removably securing said rigid body to a flat surface.

2. A spirit level for tile and cabinet installation as described in claim 1, wherein the means for removably attaching the auxiliary edge portion to the upper planar surface of the rigid body further comprises:
    a groove, said groove being formed in the upper surface of the rigid body; and
    a mating tongue portion, said tongue portion extending downwardly from the lower supporting edges of the auxiliary edge portion and being sized, shaped, and disposed lower supporting edges to removably engage said groove so that the top surface of the auxiliary edge portion will be parallel to upper surface of the rigid body and the level will have a width equal to the sum of the first predetermined width and the second predetermined width.

3. A spirit level for tile and cabinet installation as described in claim 2 further comprising:
    at least one threaded hole, said threaded hole penetrating either of the front surface and the back surface of the rigid body adjacent the planar upper surface and extending into said groove;
    at least one threaded setscrew, said setscrew being sized, shaped and of sufficient length to threadedly engage said threaded hole and to bear upon said auxiliary edge portion; and
    whereby, when the setscrew is installed in the threaded hole it will serve to removably secure said auxiliary edge portion to said rigid body.

4. A spirit level for tile and cabinet installation as described in claim 1, further comprising at least one bubble vial, said vial being fixedly attached to said rigid body for indicating when said upper and lower planar surfaces are vertically oriented.

5. A spirit level for tile and cabinet installation as described in claim 4, wherein said first end and second end include parallel planar end surfaces normal to said upper and lower planar surfaces.

6. A spirit level for tile and cabinet installation as described in claim 1, further comprising at least one bubble vial, said vial being fixedly attached to said auxiliary edge portion for indicating when said planar top surface and lower supporting edges are horizontally oriented.

7. A spirit level for tile and cabinet installation as described in claim 1 wherein the means for removably securing the rigid body to a flat surface further comprises:
    a series of holes, said holes penetrating said rigid body perpendicular to a long axis of said level; and
    at least two of either nails and screws, said nails and screws being of sufficient length to pass though said holes in said rigid body and to secure said rigid body to said flat surface.

8. A spirit level for tile and cabinet installation as described in claim 7 wherein the series of holes is evenly spaced along said rigid body to facilitate removably attaching the level to supporting structures located behind the flat surface.

9. A spirit level for tile and cabinet installation as described in claim 1 further comprising a series of frictional pads, said pads being fixedly attached to the back surface of the body and serving to facilitate positioning said level on the flat surface.

10. A spirit level for tile and cabinet installation as described in claim 1 further comprising:
- at least one adjusting notch, said adjusting notch disposed at either of the first end and second end of the rigid body at the planar lower surface;
- said adjusting notch including a recessed planar surface parallel to said planar lower surface;
- an opening, said opening being centrally located in said recessed planar surface and being sized and shaped to permit passage of a threaded shaft;
- an internally threaded nut, said nut having a planar upper surface, an internally threaded orifice orthogonal to said planar upper surface and having a diameter smaller than said opening;
- said nut being fixedly attached to said recessed planar surface over said opening;
- a threaded bolt, said bolt having a threaded shaft sized and shaped to threadedly engage said nut and being of sufficient length to extend outwardly from said nut to a point beyond said planar lower surface when unscrewed from said nut; and
- whereby, when said bolt threadedly engages the nut affixed to the recessed planar surface, it is unscrewed sufficiently from said nut to extend beyond said planar lower surface, it will serve to adjust said planar lower surface to an uneven surface.

11. A spirit level for tile and cabinet installation as described in claim 1 further comprising:
- at least one adjusting notch, said adjusting notch disposed at either of the first end and second end of the rigid body at the planar lower surface;
- said adjusting notch including a recessed planar surface parallel to said planar lower surface;
- a threaded opening, said threaded opening being centrally located in said recessed planar surface;
- a threaded bolt, said bolt having a threaded shaft sized and shaped to threadedly engage said threaded opening and being of sufficient length to extend outwardly from said threaded opening to a point beyond said planar lower surface when unscrewed from said opening; and
- whereby, when said bolt threadedly engages threaded opening located in said recessed planar surface, it is unscrewed sufficiently from said threaded opening to extend beyond said planar lower surface, it will serve to adjust said planar lower surface to an uneven surface.

* * * * *